R. MILNE.
APPARATUS FOR MAKING CUP LEATHERS.
APPLICATION FILED NOV. 29, 1915.
1,184,004.
Patented May 23, 1916.
4 SHEETS—SHEET 3.
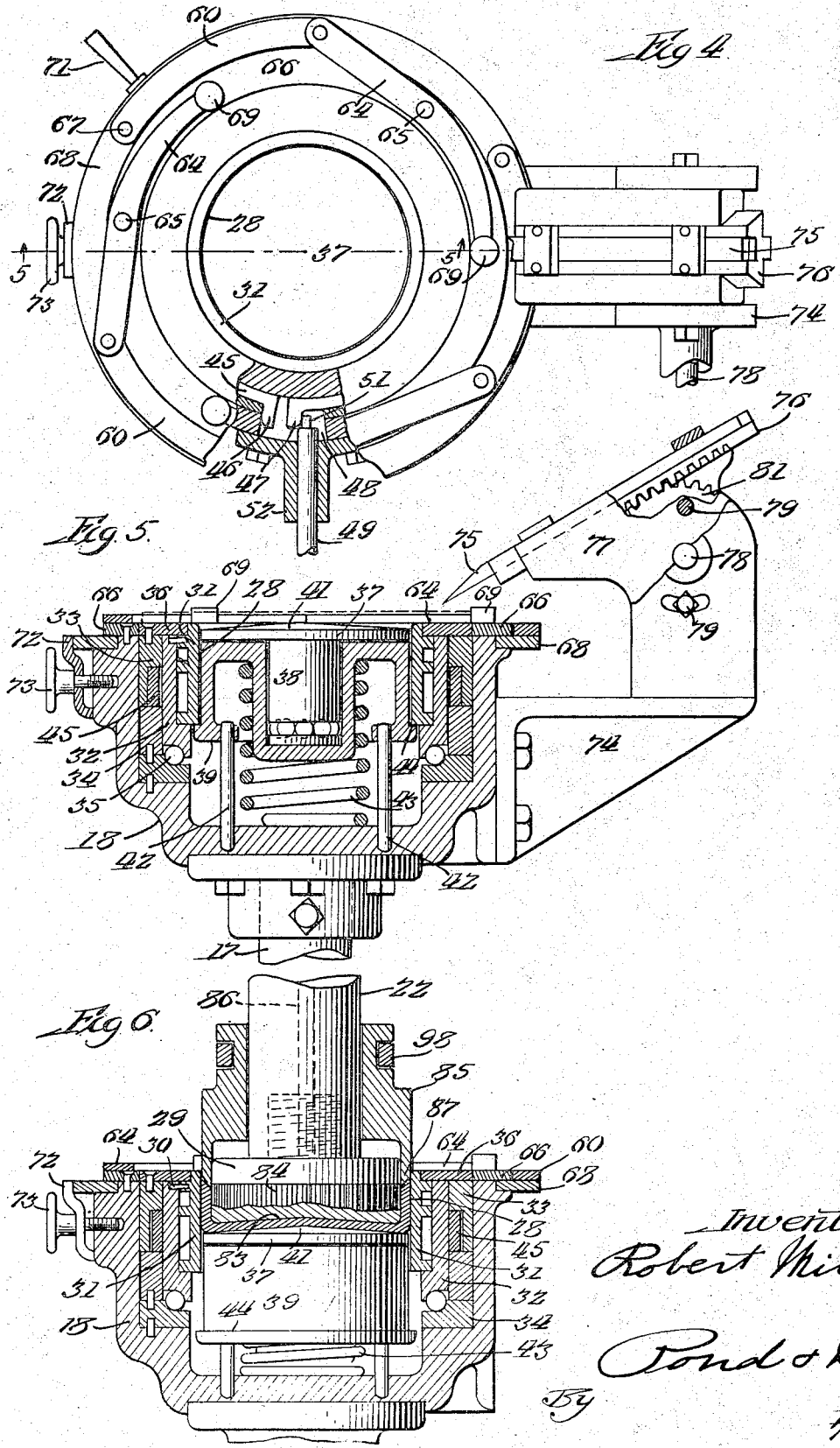

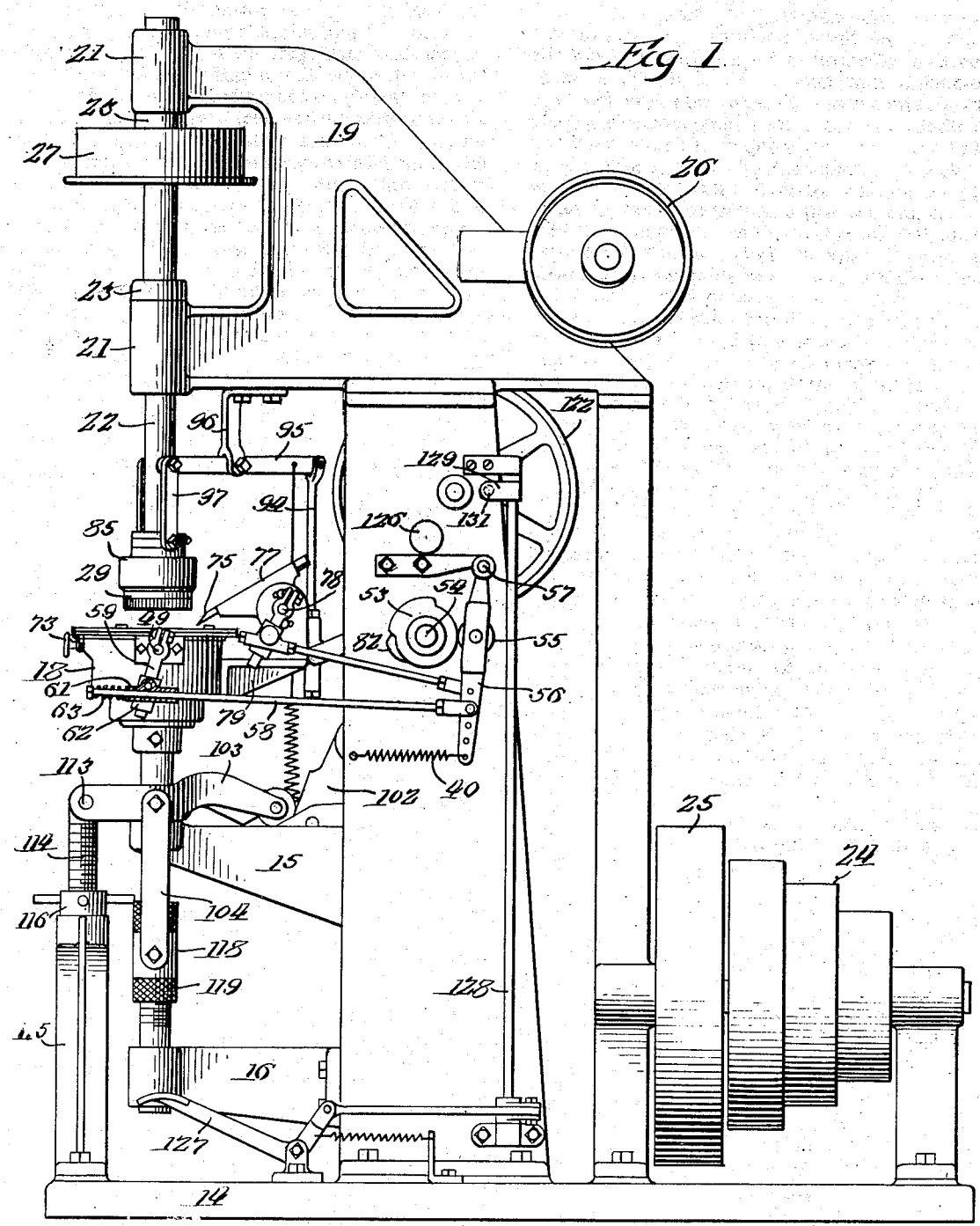

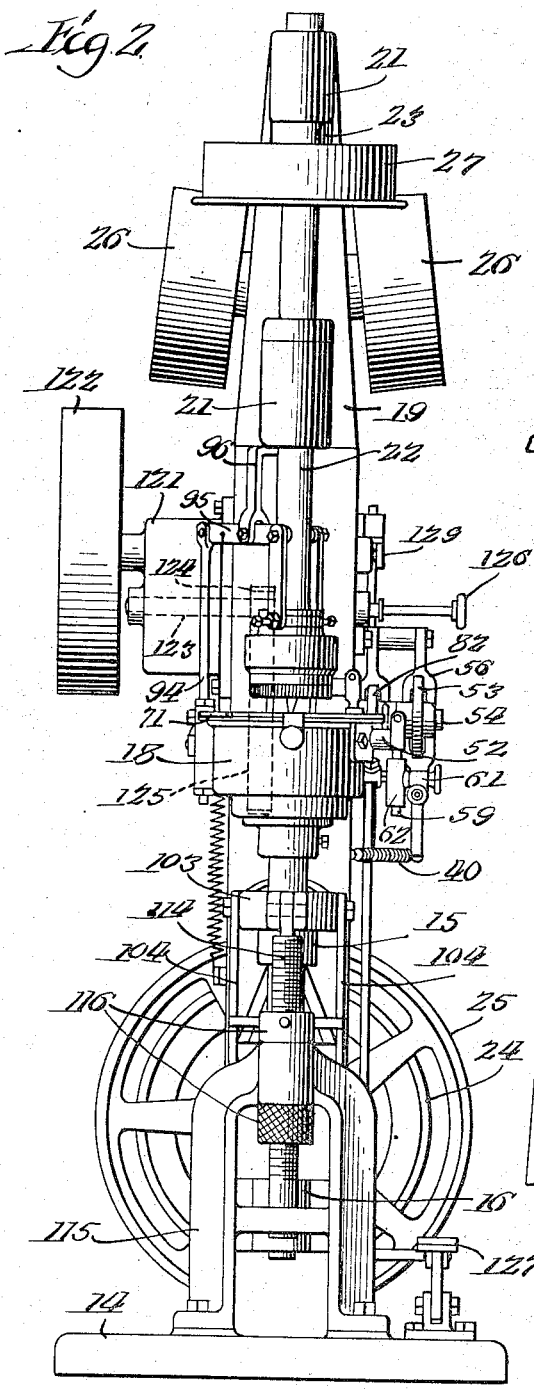

R. MILNE.
APPARATUS FOR MAKING CUP LEATHERS.
APPLICATION FILED NOV. 29, 1915.
1,184,004.
Patented May 23, 1916.
4 SHEETS—SHEET 4.
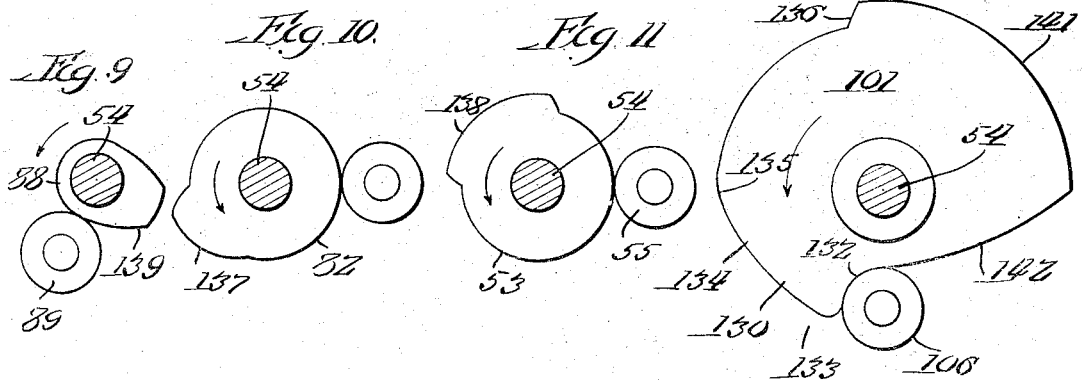
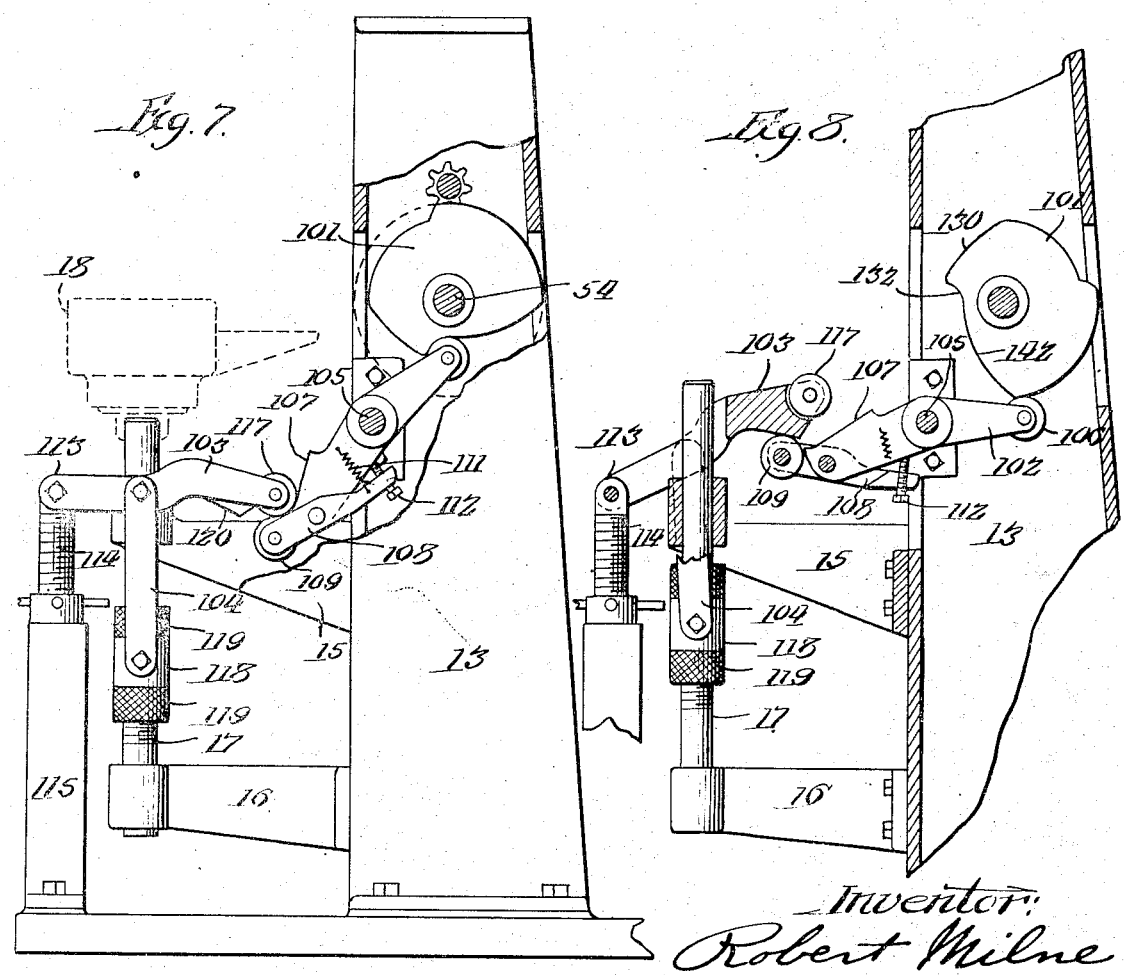
Inventor:
Robert Milne
by Pond & Wilson
Attys.

UNITED STATES PATENT OFFICE.

ROBERT MILNE, OF ROCKFORD, ILLINOIS, ASSIGNOR OF ONE-HALF TO WARD PUMP COMPANY AND ONE-HALF TO ROCKFORD LEATHER WASHER COMPANY, BOTH OF ROCKFORD, ILLINOIS, CORPORATIONS OF ILLINOIS.

APPARATUS FOR MAKING CUP-LEATHERS.

1,184,004.  Specification of Letters Patent.  Patented May 23, 1916.

Application filed November 29, 1915. Serial No. 64,045.

*To all whom it may concern:*

Be it known that I, ROBERT MILNE, a citizen of the United States, residing at Rockford, in the county of Winnebago and State of Illinois, have invented certain new and useful Improvements in Apparatus for Making Cup-Leathers, of which the following is a specification.

This invention relates to the manufacture of cup-shaped articles known as cup leathers, and has more particular reference to that type of machine for making cup leathers described in the pending application of Richard S. Collins and Frank W. Trostle, Ser. No. 59,136, filed Nov. 1, 1915.

In the manufacture of comparatively large sized cup leathers difficulties are encountered that are not met in making those of smaller sizes. If a leather blank of heavy stock from which the larger cup leathers are made is tempered or softened too much by being soaked too long in a liquid to prepare the stock for working, it is very pliable and may be easily pressed into cup shape; but the cup will not retain its desired shape when made under these conditions unless put through a baking process which is slow and expensive. When heavy leather stock is tempered to a minimum extent and properly worked and formed into cup shape, the cup leather will retain its shape.

The primary object of my invention, therefore, is to provide an efficient means for manufacturing at low cost of production, comparatively large sized cup leathers from heavy stock tempered to a minimum extent and to so form the cup leathers that they will retain the desired shape.

Another object of my invention is to provide an apparatus for automatically forming cup leathers from blanks in such manner that the raised wall or flange of a cup will be treated and worked so as to be strengthened, compressed, trued and polished, whereby to possess superior wearing qualities.

A further object is to provide a machine of improved construction for automatically making cup leathers in which the mechanism is especially designed to meet the peculiar conditions arising under and incident to working heavy leather stock into cup leathers. In this connection, I have provided a novel mechanism for controlling and operating the cup-forming dies, in which the operating power from a constant source is transmitted to the dies in a variable force in accordance with the power required by the dies to perform their several operations and at a variable speed proportioned to increase the efficiency of the machine.

Other objects and attendant advantages will be apparent as the invention becomes better understood by reference to the following description when considered in connection with the accompanying drawings, wherein—

Figure 1 is a side elevation of a machine for making cup leathers embodying my improvements, the machine being shown in idle or work-receiving position; Fig. 2 is a front elevation of the machine; Fig. 3 is a fragmentary view of the side of the machine opposite that shown in Fig. 1; Fig. 4 is a plan view partially in section of the table containing the trimming device and female die; Fig. 5 is a vertical sectional view through the table taken on the line 5—5 of Fig. 4; Fig. 6 is a similar sectional view and shows a cup leather in the course of being formed by the dies; Fig. 7 is a fragmentary view of the mechanism for raising and lowering the table, the table being shown in its lowermost position; Fig. 8 is a similar fragmentary view and shows the position of the raising mechanism when the table is raised to its highest position; and Figs. 9, 10, 11, and 12 are diagrammatic views of several cams employed for operating different mechanisms in the machine.

While the principle of operation of my present machine follows in a general way that described in the pending application mentioned above, it will be apparent as my invention becomes better understood that I have materially improved the apparatus for making cup leathers therein disclosed and have provided improved mechanism for performing certain new functions all of which will be fully described hereinafter.

Referring to the drawings, it will be observed that an upright frame 13 mounted on a base 14 has secured to its front face a pair of vertically spaced journal brackets 15 and 16 in which is slidingly mounted an upright post or support 17 on the upper end of which is fixedly secured a table designated in general by the character 18, which table carries a female die and a trimming device described more particularly hereinafter. Means also described hereinafter are provided for raising and lowering the post 17 so as to bring the die thereof into and out of coöperation with a male die. The frame 13 supports a top frame section 19 shaped to provide vertical journals 21 in which a shaft or spindle 22 is rotatably mounted co-axially above the table 18 and held against lengthwise movement by collars 23. The spindle 22 equipped at its lower end with a male die is adapted to be driven at a constant predetermined speed during operation, and in the present instance, I have shown a pulley drive whereby the spindle may be driven at any one of several constant speeds from the cone pulley 24 through the intermediary of a belt drive connecting the pulleys 25, 26 and 27.

The cup-forming dies shown in detail in Figs. 4 to 6 inclusive comprise, in general, a female die having a circular bore 28 and a forming-head or male die 29 adapted to enter, by the operation of raising the table 18, said bore to press an interposed blank into cup shape. The cylindrical member 31 which contains the bore 28 is mounted in a second cylindrical member 32 having bearing in the bushings 33 and 34 and the end-thrust ball bearing 35 and is held against outward displacement by a ring 36 fixed to the upper bushing 33 and is locked to rotate with the member 32 by means of a pin 30. A disk or seat 37 having an integral hub 38 rotatably mounted in a carriage 39, is provided with a cone-shaped top face 41 for a purpose hereinafter explained, it being noted that the disk 37 is of substantially the same diameter as the bore 28 and is adapted to rotate freely on the axis of the bore. The carriage 39, adapted to move axially of the bore and guided in such movement by rods 42 secured in the base of the table, is constantly urged toward the mouth of the bore by a coiled expansion spring 43 and limited in such outward movement by an annular shoulder 44 of the carriage abutting against the inner end of the member 31, in which position the face of the disk 37 is substantially flush with the top of the table as shown in Fig. 5.

From the foregoing it will be apparent that the carriage 39 may be moved into the bore 28 on the rods 42 against the pressure of the spring 43, that the disk 37 may be rotated in the carriage, and that the cylindrical members 31 and 32 may be rotated as a unit.

Means are provided for retarding rotation of the member 31—32, comprising a split band 45 embracing the said member and adapted to be clamped thereto. The band 45 is provided with upset ends 46 and 47 disposed in a recess 48 in the bushing 33 and table 18, the end 46 being held stationary by reason of it abutting against one wall of said recess and the end 47 being movable to clamp the band onto the rotary member by means of a rock shaft 49 having an eccentric stud 51 engaging the end 47, the rock shaft being journaled in a bearing bracket 52 bolted to the table 18. The said shaft 49 is rocked at predetermined intervals by means of a cam 53 secured to a cam shaft 54 journaled in the frame 13. A yieldable and adjustable connection is established between the rock shaft and the cam follower to permit the band to be applied with different degrees of gripping force. This connection comprises a cam follower 55 mounted on a lever 56 pivoted at one end on a pin 57 secured to the frame 13 and connected at its opposite end by a link 58 to a rocker arm 59 secured to the rock shaft 49, the connection between the link 58 and rocker arm 59 being in the form of a sleeve member 61 pivotally mounted on a member 62 which is adjustably secured to the rocker arm 59 and a spring 63 interposed between a nut on the end of the link 58 and the member 61. A contractile spring 40 holds the follower 55 in engagement with the cam 53. It will be observed that by adjusting the said nut on the link 58, the tension of the spring 63 may be varied so as to effect a greater or less gripping action by the band brake.

Means are provided for centering circular blanks of leather on the table and said centering means are adjustable to center blanks of various diameters when different sized cups are being formed. Referring to Figs. 4 and 5, this means comprises a plurality of centering arms 64 pivoted intermediate their ends at 65 to a ring 66 pivotally secured to the top of the table just outside of the ring 36. The centering arms are each connected at their outer ends to a link 60 which in turn is pivoted at 67 to a ring 68 rotatably mounted on the table on ways formed partly by the ring 66. It will be apparent that by shifting the ring 68 by means of a handle 71 in a clockwise direction, viewing Fig. 4, the centering arms 64 will be swung on their pivots so as to equally carry the inner ends 69 of said arms toward the center of the table. The centering device is adapted to be set in a fixed position for a predetermined sized blank and, as shown in Fig. 4, is set for a blank of maximum size, since the dies, as shown, are of a maximum size for this particular machine. The centering device may be held in set position by means of a plate 72 adapted to clamp the ring 68 fixedly to the table 18 by the action of thumb screw 73.

A trimming means substantially similar to that described in said pending application is mounted on a bracket 74 mounted on the table 18 and comprises a cutter 75 secured to a carriage 76 slidably mounted in a carrier 77 which, in turn, is adjustably mounted on the bracket 74 to turn about the axis of the shaft 78 and is held fixed with respect to said bracket by bolts 79. A gear 81 fixedly secured to said shaft 78 meshes with a rack on the carriage 76 so that upon rocking the shaft 78, the knife will be projected into the bore 28 to trim or bevel the raised edge or flange of a cup and be retracted therefrom. The trimming device is controlled by a cam 82 fixedly secured to the cam shaft 54, the connection between the said cam 82 and the trimming device being similar to that between the cam 53 and the brake device with the exception that the connection to the rock shaft 78 does not include a yieldable joint.

The forming-head or male die 29 secured by a screw-threaded connection to the spindle 22 is of a diameter sufficiently smaller than that of the bore 28 to permit the head to enter said bore with a leather blank interposed and tightly pressed between the two, as shown in Fig. 6. As will be noted in this figure, the end of the head 29 is slightly concaved or dished at 83 conforming to the shape of the face 41 of the disk 37 and the peripheral surface of the head adjacent to its end is knurled a substantial depth as at 84, giving the head a fluted periphery. A flange compressing member 85 splined at 86 on the spindle 22 is shaped to provide a ring 87 of a thickness just sufficient to permit entrance thereof into the annular space between the wall of the bore 28 and the forming head 29. This ring 87 is beveled at its end corresponding to the bevel given a cup leather by the trimming device. The flange-compressing member 85 is adapted to be moved axially of the spindle to carry its ring 87 into and out of the cup compartment by means of a cam 88 fixedly secured to the cam shaft 54 (Fig. 3) and intermediate connections from the cam to the compressing member. These connections comprise a cam follower 89, carried by one arm of a bell crank lever 91 pivoted to the frame 13 at 92 and pivotally connected at its opposite end to a sleeve 93 in which is adjustably secured an upright link 94. This link is pivotally connected to one end of a lever 95 pivoted intermediate its ends to a bracket 96 bolted to the top frame section 19 and pivotally connected at its opposite end through the intermediary of links 97 to a band 98 fitting in an annular groove in the compressing member. A contractile spring 99 holds the cam follower 89 in engagement with the cam 88 and holds the compressing member in raised inoperative position. It will be apparent that upon rotating the cam shaft the follower 89 will be actuated to project the compressing member into the cup compartment, the spring returning the several parts to idle position as the raise in the cam leaves the follower.

The mechanism for moving the table 18 to carry its die into and out of coöperation with the forming head will now be described. Referring to Figs. 7 and 8, this mechanism comprises, generally stated, a rotary cam 101 fixedly secured to the cam shaft 54, intermediate the side walls of the frame 13 and connections from said cam to the post 17 in the form of coöperating levers 102 and 103 and links 104 from the latter lever to the post. The lever 102 pivoted intermediate its ends at 105 to the frame 13 is equipped at one end with a cam follower 106 and provided at its opposite end with a cam face 107 disposed when the cam is in stroke-starting position in an inclined plane approximately vertical (see Fig. 7). The forward or lower end of the lever 102 is also equipped with a supplemental end piece 108 pivotally mounted on the lever and equipped at its forward end with a roller 109 and maintained in a predetermined relation to the lever 102 by springs 111 which hold the adjusting screw 112 of said supplemental end piece 108 in contact with the lever 102. The lever 103, in the form of a yoke straddling the post 17, is pivotally mounted at its forward end 113 to the upper end of a threaded rod 114 rigidly held in a yoked bracket 115 secured to the base 14 so as to provide a pivot fulcrum and rigid mounting for the forward end of said lever. Adjusting nuts 116 screwed onto the rod 114 hold the same in fixed position and permit the rod to be vertically adjusted to likewise adjust the fulcrum of the lever 103. This lever is equipped at its rear end with a roller 117 disposed when the parts are in idle or starting position, in contact with the roller 109 and the base of the inclined cam face 107, as shown in Fig. 107. The lever 103 is also provided at its rear end with a cam face 120 with which the roller 109 is adapted to coöperate as will appear hereinafter. Links 104 pivotally connected to the lever 103 intermediate the ends thereof are pivotally connected at their lower ends to a collar 118 confined between adjusting nuts 119 threaded on the post 17. From the foregoing, it will be apparent that upon depressing the rear end of the lever 102 by rotation of the cam 101 in a counterclockwise direction, viewing Fig. 7, the forward end of the lever 102 will swing the roller-equipped end of the lever 103 upwardly thereby raising the table 18, and that by the converse of these movements the table will be lowered.

The cam shaft 54 may be driven at a constant predetermined speed by any preferred means, and while I have not deemed it necessary to illustrate in detail a complete driving mechanism, I have partially shown such mechanism in the form of a variable speed transmission contained in a housing 121 and driven by a pulley 122. The drive shaft of this transmission connects with a secondary shaft 123 (Figs. 2 and 7) equipped with a pinion gear 124, which meshes with a spur gear 125 fixed to the cam shaft 54. In this particular type of gear transmission a control member 126 is employed for shifting gears to obtain different driving speeds. Since the pulley 122 is adapted to be constantly driven, a clutch, not shown, but contained within the housing 121, is adapted to connect said driving shaft with the secondary shaft 123. The clutch is thrown into and out of operation by a foot lever 127 connected with a rock shaft 128 which in turn is equipped with a rocker arm 129 adapted to shift a rod 131 for operating the clutch. Thus by depressing the lever 127, the proper speed having been selected by adjustment of the member 126, the cam shaft 54 will be rotated in a counterclockwise direction viewing Figs. 1 and 7 to 12 inclusive, and upon releasing the lever rotation of the said cam shaft will be stopped.

The operation of the several cam-operated devices and the functions thereof in automatically making cup leathers according to my improved method will now be described.

The cup leathers are formed from a flat, circular blank of leather of suitable thickness and diameter and being properly tempered. Assuming the spindle 22 and the pulley 122 to be constantly driven, the blank is placed face down on the table within the centering arms and the foot lever 127 depressed, whereupon the machine is set in operation to automatically form the blank into a cup leather. Further, with reference to the blank and the size of the cup to be formed, it should be here noted that the machine is especially designed for making comparatively large sized cups out of heavy stock and that in working the properly tempered blank into cup shape considerable power is required in forming the corner of the cup. If the blank is overtempered, that is, soaked too long in a liquid so that it is spongy and very pliable, it is easily pressed and formed into the desired cup shape, but upon being removed from the dies it will not retain this shape. Hence, in order to secure the best results the blank should be tempered to a minimum extent, so that when being formed a sufficient amount of power will be required to work the fibers into cup shape so that they will retain this shape, it being understood that certain steps are taken in the formation of a cup leather to compress and fix the fibers so that they will remain fixed in the cup shape after being removed from the machine. Viewing Figs. 7 and 12, it will be observed that the initial movement of the cam 101 will impart a quick rocking movement to the lever 102 by reason of the sharp cam face 132 until the follower 106 engages the inner end 133 of the inclined face 130. The quick raising movement of the forward end of the lever 102 causes the roller 117 to roll quickly up the inclined cam face 107 due to the fact that said face so closely approaches the vertical, swinging the lever 103 upwardly and consequently raising the table by a rapid traverse movement until the blank is substantially in engagement with the rotating head 29. During this initial movement of the levers, the roller 117 has traveled to substantially the upper end of the cam face 107 and thus moved nearer to the pivot axis of the lever 102. As the cam 101 continues to rock the lever 102, an increasing leverage is obtained, because of shortening the effective length of the forward arm of the lever 102. The succeeding operation of the cam from the point 133 to substantially the point 134 imparts a slow rocking movement to the lever 102, during which period the corner of the cup is formed. It will be noted that this portion of the cam face, viz., between the points 133 and 134, presents a very gradual rise so that a maximum mechanical advantage is obtained from the cam 101 and that a further mechanical advantage is obtained from the levers by reason of the increased leverage due to the roller 117 approaching the pivot axis 105 of the lever 102. Referring back to the point in the operation at which the head 29 engages the blank, the latter as it is pressed by the head against the disk 37 will be rotated with the said head and will itself rotate the disk due to frictional engagement therewith and will be dished inwardly at its center portion by the faces 41 and 83 of the disk 37 and head 29, respectively. Upon the blank being pressed into the bore 28, the cylindrical wall of the bore will be rotated due to frictional engagement with the blank. Continued projection of the blank into the bore forms the corner of the cup, which corner is substantially completed when the point 134 on the cam 101 reaches its follower 106. This pressing and spinning action in forming the corner of the cup requires considerable power, and, as explained above, the cam 101 and connection therefrom to the table is such that a maximum operating power is obtained during this period. With the cam-actuated parts in position reached at the point 134 of the cam 101, the roller 109 has been carried into engagement with the cam face 120 on the lever 103 so that upon continued rotation of the cam 101 to the point 135 the effective length of the forward end of the lever 102 will be suddenly increased from the point of engagement with the roller 117 with said lever 102 to the roller 109 which engages the cam face 120. This decreases the leverage and gives a longer effective length to the forward arm of the lever 102 and a shorter effective length to the arm 103 so that the cam 101 in moving between the points 134 and 135 effects a quick raising movement of the table determining the depth of the cup. It will be noted that after the corner has been formed, less power is required to press the blank deeper into the bore to predetermined depth and that the lever arrangement described effects this movement of the cup at a quicker speed at the expense of an unnecessary amount of operating power as compared with the operation of the levers in forming the corner of the cup. During forming of the corner and pressing the cup to depth the ribbed or knurled face 84 of the head 29 will be pressed into the inner face of the raised wall or flange of the cup thereby establishing a positive driving connection between the rotating head and the cup and also forming ribs on the inner face of the cup flange which give a stiffening and strengthening effect thereto. It will also be apparent that as the cup is projected into the bore the pressure against the end of the cup is increased, thereby tending to more thoroughly fix the end of the cup in dished shape. Since the surface of the cam 101 from the points 135 to 136 is the arc of a circle concentric with the center of the cam, the table remains stationary, and during this period the raise 137 on the cam 82 projects the trimming tool 75, which bevels the edge of the cup flange and retracts said tool. At the conclusion of the trimming operation three of the cams, viz. 53, 88 and 101 actuate their respective devices substantially simultaneously. In this connection, the rise 138 on the cam 53 clamps the brake 45 onto the member 32 stopping rotation of the member 31; the rise 139 of the cam 88 projects the flange compressing member 85 into the cup compartment; and the rise 136 of the cam 101 raises the table and further projects the cup into the bore 28. The effect of projecting the cup farther into the bore is to smooth off any roughness from the trimmed edge of the cup. The compressing member is brought down onto the cup with such pressure as to axially compress the flange so that the fibers thereof and in the corner portion of the cup are bound closely together and more firmly set and fixed in the cup formation. Since the forming member engaging the periphery of the cup is held stationary and the cup is positively driven by the forming head, considerable frictional resistance is induced between the flange and forming member 31 which heats the cup and thus fixes to a greater extent the fibers of the leather in the cup shape. This rotation of the cup with respect to the member 31 also trues, makes perfectly round, and polishes and hardens the periphery of the cup.

It will thus be apparent that various forces are applied in shaping and fixing the blank into cup shape. Not only is the blank pressed and spun into shape, trimmed, and heated by frictional resistance to fix the fibers in the cup shape as described in the pending application above mentioned, but the cup is strengthened by the ribbed formation of its inner flange face, trued and polished on its outer flange face, and axially compressed at its flange and corner while these parts are held in the forming members and being heated by frictional resistance whereby the fibers are subjected to considerable pressure subsequent to having been formed in the cup shape and thus not strained or injured while being worked into said shape. The cup is also dished inwardly at its end producing a corner having an acute angle. Thus, after the cup is removed from the machine, it will possess and retain a substantially flat end since there is a slight tendency of the end to bulge outwardly when removed from the forming members. The acute formation of the corner further aids to retain the permanent right angle corner form because of the tendency of the flange to slightly flare outwardly.

In concluding the formation of the cup the compressing member 85 is withdrawn, the band 45 released and the table lowered, all substantially simultaneously, it being apparent that by reason of the sharp fall 142 in the cam 101, the table is quickly lowered. As the table is lowered, the spring pressed carriage 39 automatically discharges the cup from the female die.

When it is desired to make cup leathers of diameters different from that for which the dies herein shown are adapted, a new set of dies of the desired size will be used. In this connection, it will be necessary to adjust the table raising mechanism to obtain proper depth of the cup. This is effected by adjusting the nuts 116 and 119 so that the table will be raised a greater or less extend according to requirements. In making this adjustment, the relation of the lever 103 to the lever 102 will be changed and to establish their proper relation, the supplemental end piece 108 is adjusted by means of the screw 112.

It is believed that the foregoing conveys a clear understanding of my invention and its mode and principles of operation, and it should be understood that while I have illustrated but one embodiment of my improvement, various changes and alterations might be made without departing from the essence of the invention as expressed in the appended claims.

I claim:

1. In a machine for forming cup leathers, the combination of cup forming dies normally disposed in spaced relation and adapted to be moved into coöperation to successively form from a leather blank the corner of the cup and press the cup to predetermined depth, and means controlling the operation of the forming dies and operated from a source of constant power for bringing the dies into coöperative relation in a rapid traverse movement, forming the corner of the cup in a slower movement and with an operating force greater than that involved in the initial movement, and pressing the cup to depth in a quicker movement and with less operating power than involved in said corner forming operation.

2. In a machine for forming cup leathers, the combination of cup-forming dies constructed for spinning and pressing a blank into cup shape, and means for operating said dies to form the corner of a cup at a given speed and operating power and to press the cup to depth at a higher speed and less operating power than involved in the corner-forming operation.

3. In a machine for forming cup leathers, the combination of cup-forming dies constructed for spinning and pressing a blank into cup shape, a cam having an inclined face, means for moving the cam at a uniform speed from a uniform source of power, and means actuated by said inclined face of the cam for operating the dies to form the corner of a cup and press the cup to depth with a variable operating power greater during the corner-forming operation than when pressing the cup to depth.

4. In a machine for making cup leathers, the combination of coöperating dies adapted for spinning and pressing an interposed blank into cup shape, a rotary cam, and means actuated by said cam for bringing the dies into coöperation to form the corner of the cup and press the cup to depth with a variable operating power greater during the operation of forming the corner than when pressing the cup to depth.

5. In a machine for forming cup leathers, the combination of forming-dies adapted for pressing a blank into cup shape, a rotary cam, and lever and link transmission mechanism actuated from said cam for operating the dies to successively form the corner of a cup and press the cup to depth, said cam-actuated mechanism being so organized that its power transmitting capacity is greater during the operation of forming the corner of the cup than when pressing the cup to depth.

6. A machine for forming cup shaped articles comprising cup-forming dies adapted to be moved relatively to press an interposed blank into cup shape, and means for effecting such movement comprising a rotary cam, a lever pivoted intermediate its ends and arranged to be rocked by the cam, and a second lever connected with one of the forming dies and arranged to engage and be rocked by the first lever to effect said relative movement of the dies, the levers being so constructed and arranged that their point of engagement will approach the pivot axis of the first lever as they are rocked, whereby to increase the leverage when pressing the blank into cup shape.

7. A machine for forming cup shaped articles comprising cup-forming dies adapted to be moved relatively to press an interposed blank into cup shape, a rotary cam, and means actuated thereby for moving said dies relatively to press a blank into cup shape in successive movements, said movements comprising moving the dies to coöperative relation wherein an interposed blank is engaged by both dies, forming the corner of the cup, and pressing the cup to depth, said cam-actuated means being so organized as to transmit a greater operating force in forming the corner than during the other movements.

8. In a machine for forming cup shaped articles, the combination of cup-forming dies constructed to press an interposed blank into cup shape by projection of one die into the other, means for rotating one of the dies and the blank while the blank is being pressed into cup shape, and means for effecting the said projection of one die into the other in successive movements, the first of which forms the corner and is slower and under a greater operating power than the second which presses the cup to depth, whereby injury to the fibers of the blank in the corner-forming operation is avoided.

9. In a machine for forming cup shaped articles, the combination of cup-forming dies constructed for forming an interposed blank into cup shape by projection of one die into the other, and means for moving one of the dies with respect to the other to form a cup, comprising a lever connected intermediate its ends with said movable die and fulcrumed at one end on a fixed pivot, a second lever fulcrumed intermediate its ends on a fixed pivot and arranged so that one of its ends coöperates with the free end of the first named lever for actuating the same, and a rotary cam constructed and arranged to actuate the other end of the second lever to effect projection and retraction of the movable die through the medium of said levers.

10. A machine for forming cup leathers comprising a rotatable female die, a rotary forming head adapted to press an interposed blank into the female die, means for rotating the head, means establishing a positive driving connection between the head and blank whereby the latter will be rotated when pressed into the female die which in turn will be rotated through frictional engagement with the blank, and means for retarding rotation of the female die whereby to effect, through frictional resistence with the rotary blank, a truing and fixing of the flange of the cup and a polishing of the outer face of said flange.

11. A machine for forming cup leathers comprising in combination a rotatable female die, a rotary forming head adapted to press an interposed blank into the female die, means for rotating the head, means establishing a positive driving connection between the head and blank whereby the latter will be rotated when pressed into the female die which in turn will be rotated through frictional engagement with the blank, means for retarding rotation of the female die, and means for axially compressing the flange of the cup while the same is being rotated.

12. A machine for forming cup leathers, comprising means for spinning and pressing a blank into cup shape, means for subjecting the flange of the cup to frictional resistance by relative rotation of the cup-forming means, and means for axially compressing the said flange while held in said forming means.

13. A machine for forming cup leathers comprising means for spinning and pressing a blank into cup shape, including die members engaging the inner and outer sides of the flange of the cup, the inner die member being power driven and the outer member being driven through frictional engagement with the blank, the inner member having a knurled or fluted periphery so as to positively take hold of and rotate the blank, and means for retarding rotation of the outer die member whereby to create frictional resistance between the same and the outer face of the flange.

14. A machine for forming cup leathers comprising in combination, means for spinning and pressing a blank into shape, including means for subjecting the flange of a cup to frictional resistance after the blank has been pressed to cup shape, and means for axially compressing the flange of the cup while it is being subjected to said frictional resistance.

15. A machine for forming cup leathers comprising in combination, forming means for spinning and pressing a blank into cup shape, and means rotating with the cup for axially compressing the flange thereof while the cup is being rotated and held in said forming means.

16. In a machine for forming cup leathers, the combination of a female die, a member slidable axially therein and having its outer face cambered, a spring holding said cambered member with its face substantially flush with the entrance to the said die, a forming head adapted to enter said die and having its end dished to conform to the cambered face of said slidable member, and means for effecting rotative movement of the head and die so that the head will enter the female die and press an interposed blank into a cup shape wherein the bottom of the cup is dished inwardly.

17. In a machine for forming cup leathers, the combination of a rotatable female die, a forming head adapted to enter said die and having a portion of its periphery knurled, means for rotating the head, and means for moving the head and die relatively so that the former will enter the latter and press an interposed blank into cup shape and simultaneously form the inner face of the flange of the cup into the shape of the knurled periphery of the head.

18. Apparatus for making cup leathers comprising means for spinning and pressing a substantially flat blank of leather into cup shape, and means for axially compressing the flange of the cup while it is being rotated by the first named means.

19. Apparatus for making cup leathers comprising means for spinning and pressing a substantially flat blank of leather into cup shape including forming elements engaging the inner and outer faces of the cup flange, and means for causing the outer face of the raised flange of the cup to be subjected to frictional resistance induced from relative rotation of the cup and the forming element engaging the outer face of the cup flange thereof.

20. Apparatus for making cup leathers comprising dies constructed to be pressed one into the other for forming an interposed blank into cup shape, and means for rotating one of the dies during and to assist in the formation of a cup, said dies being in direct engagement with both sides of the central portion of the blank while the blank is being pressed and formed into cup shape and being formed to dish the said central portion or cup bottom inwardly during said formation of the cup.

21. Apparatus for making cup leathers comprising male and female dies by means of which an interposed blank may be pressed into cup shape, and means for slowly applying pressure to said dies during and to effect the formation of the corner of the cup, and more rapidly applying pressure during and to effect the formation of the cylindrical wall or flange of the cup.

22. Apparatus for making cup leathers comprising male and female dies by means of which an interposed blank may be pressed into cup shape, and means for slowly applying a gradually increasing pressure to said dies during and to effect the formation of the corner of the cup, and more rapidly applying a substantially uniform but lesser pressure during and to effect the formation of the cylindrical wall or flange of the cup.

ROBERT MILNE.